(No Model.)
W. A. SHAW.
INSULATED CONDUCTOR OF ELECTRICITY.
No. 292,694. Patented Jan. 29, 1884.
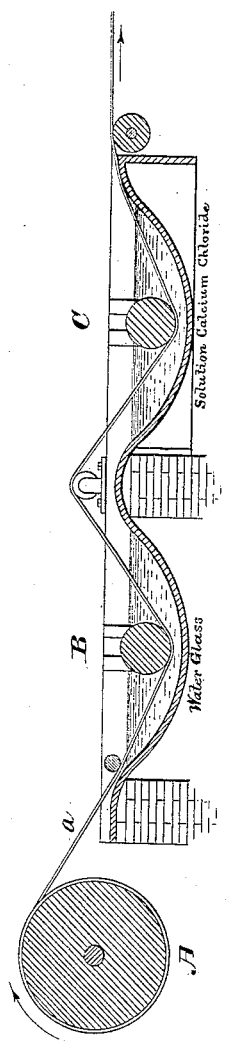
Attest:
Geo. T. Smallwood.
C. J. Hedrick
Inventor
William Anthony Shaw by
A. Pollok
his attorney

UNITED STATES PATENT OFFICE.

WILLIAM ANTHONY SHAW, OF PITTSBURG, PENNSYLVANIA, ASSIGNOR OF ONE-HALF TO LEBBEUS H. ROGERS, OF NEW YORK, N. Y.

INSULATED CONDUCTOR OF ELECTRICITY.

SPECIFICATION forming part of Letters Patent No. 292,694, dated January 29, 1884.

Application filed June 25, 1883. (No model.)

*To all whom it may concern:*

Be it known that I, WILLIAM ANTHONY SHAW, a resident of Pittsburg, Allegheny county, Pennsylvania, (formerly of Brooklyn, in the county of Kings and State of New York,) have invented a new and useful Improvement in Insulated Conductors of Electricity, which improvement is fully set forth in the following specification.

The invention consists in providing the wire or conductor with a coating formed by precipitating alkaline silicate with chloride of calcium, the wire being first run through or coated with a solution of silicate of soda or potash, and then subjected to the action of the precipitating reagent. The wire may with advantage be covered with cotton, linen, or other fiber, and then run through the solutions; but bare wire may be used.

The accompanying drawing illustrates the said mode.

A is a reel from which the cotton-covered or other wire $a$, covered or uncovered, passes through or under a bath of soluble glass (water-glass or alkaline silicate) contained in a suitable vessel, B, and thence through a solution of chloride of calcium in a vessel, C. The wire carries with it into the calcium-chloride bath a film or coating of alkaline silicate, which is decomposed by the calcium chloride, an insoluble coating of calcium silicate being produced on the wire. The wire is allowed to dry, and may then immediately, or after an interval, be wound upon the soft-iron core of the armature of a dynamo-electric machine, in any ordinary or suitable way of winding such armatures.

Wire protected with a flexible fire-proof coating—such as above described, or of other suitable form—may be used for winding electro-magnets of telephones or telephonic apparatus and translating devices generally, and thus the danger of fire arising from the diversion of the current from other conductors, or from lightning, or from exposure of the coils to excessive currents from other sources is avoided. The coated wire may also be used for other purposes. The fireproofing may be the whole or a part only of the insulating material.

I claim—

The method of covering wire with fire-proof insulating material by coating the same with soluble glass, then subjecting it to the action of a decomposing agent—such as calcium chloride—so as to render the same insoluble, substantially as described.

In testimony whereof I have signed this specification in the presence of two subscribing witnesses.

WM. ANTHONY SHAW.

Witnesses:
A. POLLOK,
PHILIP MAURO.